US 8,479,023 B2

(12) United States Patent
Picard et al.

(10) Patent No.: US 8,479,023 B2
(45) Date of Patent: Jul. 2, 2013

(54) POWER OVER ETHERNET SYSTEM AND METHOD FOR DETECTING DISCONNECTION OF A DEVICE

(75) Inventors: Jean Picard, Hooksett, NH (US); Barry Jon Male, West Granby, CT (US)

(73) Assignee: Texas Instruments Incorporated, Dallas, TX (US)

( * ) Notice: Subject to any disclaimer, the term of this patent is extended or adjusted under 35 U.S.C. 154(b) by 504 days.

(21) Appl. No.: 12/770,319

(22) Filed: Apr. 29, 2010

(65) Prior Publication Data

US 2011/0154086 A1  Jun. 23, 2011

Related U.S. Application Data

(60) Provisional application No. 61/289,854, filed on Dec. 23, 2009.

(51) Int. Cl.
 *G06F 1/26* (2006.01)
(52) U.S. Cl.
 USPC .......................................... 713/300; 324/705
(58) Field of Classification Search
 USPC .......................................... 713/300; 324/705
 See application file for complete search history.

(56) References Cited

U.S. PATENT DOCUMENTS

| 5,406,260 | A | 4/1995 | Cummings et al. |
| 7,532,017 | B2 * | 5/2009 | Anderson ..................... 324/705 |
| 2003/0146765 | A1 | 8/2003 | Darshan et al. |
| 2007/0133238 | A1 | 6/2007 | Herbold |
| 2008/0080105 | A1 | 4/2008 | Blaha et al. |
| 2010/0078992 | A1 * | 4/2010 | Landry et al. ..................... 307/2 |

OTHER PUBLICATIONS

PCT Search Report mailed Aug. 25, 2011.

* cited by examiner

*Primary Examiner* — Albert Wang
(74) *Attorney, Agent, or Firm* — William B. Kempler; Wade J. Brady III; Frederick J. Telecky, Jr.

(57) ABSTRACT

A detection system to detect disconnection of a powered device from a link of a power over Ethernet system is disclosed. The detection system can include closed-loop control configured to supply a predetermined test current to an electrically conductive path that includes at least a portion of the link via which the powered device is connectable for receiving power. A detector is configured to monitor the closed-loop control, the loop detector providing a disconnect signal if the closed-loop control is outside of expected operating parameters, thereby indicating that the powered device has been disconnected from the link.

19 Claims, 2 Drawing Sheets

POWER OVER ETHERNET SYSTEM AND METHOD FOR DETECTING DISCONNECTION OF A DEVICE

RELATED APPLICATION

This application claims the benefit of U.S. Provisional Application No. 61/289,854, filed on 23 Dec. 2009 and entitled PoE PD DISCONNECT DETECTION, which is incorporated herein by reference.

BACKGROUND

The IEEE 802.3af Ethernet standard, also known as the Power over Ethernet (PoE) standard, describes a system to safely pass electrical power, along with data, on Ethernet cabling in a powered network. In addition to carrying data as in a traditional network, powered networks also provide DC power to one or more powered devices (PDs). By connecting a PD to a powered network, such device does not require additional AC wiring or an external power source.

In a powered network, power sourcing equipment (PSE) is configured as the source of DC power. Such PSEs usually reside at distribution points in the powered network, such as an Ethernet hub, switch, router, or other network equipment. A PSE can be configured in a variety of standard as well as non-standard modes for delivering various levels or classes of power. Each of the IEEE 802.3af and the more recent IEEE 802.3 at (also known as PoE+) standards contains specifications for different levels and configuration details. One part of each standard provides each PSE a mechanism to detect the presence of a PD at a network port, such as by sensing the resistance of a PD. For instance, the PSE can detect whether a PD is attached as part of a start-up procedure before applying power.

The PoE standards also specify two general means for detecting disconnection of a PD, a DC disconnect method and an AC disconnect method. Regardless of the disconnect method, the PoE standard requires that the PSE shuts down power to a disconnected port within a predetermined time. The DC disconnect method involves monitoring a minimum DC current draw of about 5 mA to about 10 mA. The AC disconnect method that involves monitoring the AC impedance of network ports.

Existing approaches for detecting disconnection tend to result in significant power dissipation and/or are expensive to implement.

SUMMARY

The present invention provides a system and method for detecting disconnection of a powered device in a power over Ethernet system.

One aspect of the invention provides a detection system for detecting disconnection of a powered device from a link of a power over Ethernet system. The detection system can include closed-loop control configured to supply a predetermined test current to an electrically conductive path that includes at least a portion of the link via which the powered device is connectable for receiving power. A detector is configured to monitor the closed-loop control and to provide a disconnect signal if the closed-loop control is outside of expected operating parameters, thereby indicating that the powered device has been disconnected from the link.

Another aspect of the invention provides a power over Ethernet system. The power over Ethernet system includes power sourcing equipment configured to supply power to at least one port. A powered device is coupled to the port via an electrically conductive link for receiving power. A disconnect detection system is coupled to the electrically conductive link. The disconnect detection system includes closed-loop control configured to supply a predetermined test current to the electrically conductive link. A detector is configured to provide a disconnect signal in response to detecting an open loop condition in the closed-loop control indicative of the powered device being disconnected from the electrically conductive link.

Yet another aspect of the invention provides a method for detecting that a powered device has disconnected from a link of a power over Ethernet system. The method includes generating a control signal as part of a closed-loop control for delivering a test current to the link to which the powered device is connected. A disconnect signal is asserted in response to detecting an open loop condition in the closed-loop control, such as to indicate that the powered device has been disconnected from the link.

DETAILED DESCRIPTION

The invention relates to systems and method for determining whether a powered device has been disconnected from a power over Ethernet (PoE) system. Any number of one or more powered devices can be connected to power sourcing equipment (PSE) via a port or link of a corresponding PoE system. The PSE can supply power to each port and to a powered device connected to each respective port via one or more electrically conductive cable. According to an aspect of the invention, a closed loop system is utilized to supply a test current over the link during a test period. A detector is configured to determine that a powered device has been disconnected from the link based on detecting the closed-loop control is not operating within expected operating parameters.

Figure 1:
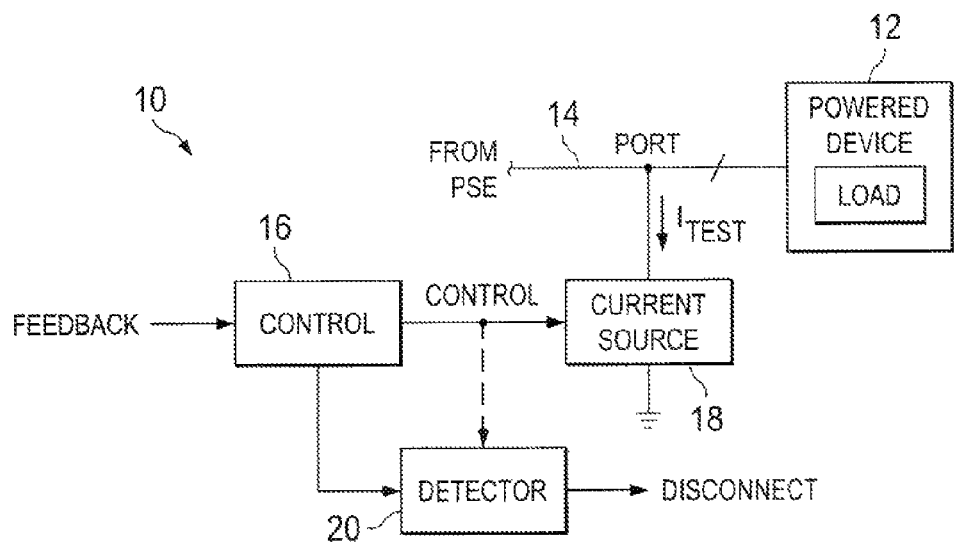
FIG. 1 depicts an example of a system to detect disconnection of a powered device from a power over Ethernet system.

FIG. 1 depicts an example of a system 10 that can be implemented to determine whether a powered device 12 has been disconnected from a link 14 of a PoE system. As used herein, the terms "port" and "link" are often used interchangeably to refer to respective parts of an electrically conductive path that can be utilized to communicate data and/or power from power sourcing equipment (PSE) to one or more powered device. It will be understood that a reference or claim that mentions a device connected to a port is intended to also cover a connection to a link via which the device is connected to the port, and that a connection of a device to a link in a PoE system would likewise imply that the link is connected to a port.

In the example of FIG. 1, a single powered device is depicted as being connected to a corresponding port (e.g., via a link) 14 of the PoE system. However, it will be understood and appreciated that any number of ports and corresponding powered devices can be implemented in a PoE system.

In order to detect that the powered device 12 has been disconnected, the system 10 employs closed-loop control to deliver a predetermined test current $I_{TEST}$ to the powered device 12. The test current $I_{TEST}$ can be supplied periodically at a predetermined rate so as to comply with power over Ethernet standards, such as disclosed in IEEE 802.3af or the Enhanced Standard 802.3 at, each of which is incorporated herein by reference. For instance, these PoE standards require that the PSE shutdowns power to a disconnected port within 300 ms to 400 ms. However, it is to be understood that the periodic rate for supplying the test current and timing for detecting the disconnection can be set to comply with any standard or proprietary protocol. The closed-loop control includes a control block 16 that supplies a control signal to a current source 18. The current source 18 in turn delivers the test current $I_{TEST}$ to the powered device 12 via the link 14 based on the control signal. The test current $I_{TEST}$ may be a positive or negative test current, for example.

The control block 16 generates the control signal based on feedback. That is, if the powered device 12 or a load thereof is electrically disconnected from the link 14 to which the test current $I_{TEST}$ is supplied, the feedback provided to the control block 16 will require a substantial increase in the test current that is to be provided. This increase in current requirements to provide the test current $I_{TEST}$, as represented by the feedback, is due to the test current $I_{TEST}$ going to zero corresponding to open circuit condition caused by the disconnection of the powered device 12.

The feedback can be provided to the control block 16 in a variety of different forms, which that can vary according to the implementation of the closed-loop control and the type of device being used as the current source 18. For example, the control block 16 can be implemented as analog circuitry, as digital circuitry or as a combination of analog and digital circuitry. As a further example, some examples of the control-loop control include pulse width modulation (PWM) loop, a microprocessor or a digital signal processing (DSP) control-loop, a Delta-Sigma current control-loop, or the like.

The system 10 also includes a detector 20 that is coupled to monitor operation of the closed-loop control. The detector 20 can be coupled to detect the disconnect condition in a variety of ways that can vary depending upon the manner in which the closed-loop current control is being implemented. For instance, the detector 20 can be coupled to the control block 16 to monitor one or more operating parameter thereof. Alternatively or additionally the detector 20 can monitor the control signal that is provided to control operation of the current source 18. The detector 20 provides a disconnect signal in response to detecting that the closed-loop control is outside of the expected operating parameters.

By way of example, during a condition in which the powered device is connected to the link during normal operation thereof, the closed-loop control can periodically deliver the test current $I_{TEST}$ based on the feedback signal. If the powered device 12 disconnects from the link 14, an open loop condition exists in which the test current cannot flow. As a result, the feedback or other control provides information requesting that a maximum current be provided to compensate for the absence of the test current $I_{TEST}$ flowing in the link.

The detector 20 can be implemented in a variety of different ways to provide means for detecting that the closed-loop control is not functioning properly as a result of the powered device being disconnected from the link 14. For the example of the control block 16 implemented as a digital controller in which a digital value is utilized to control the current source 18, the detector 20 can be implemented as logic configured to monitor a digital current control value (e.g., a multi-bit value) and in turn determine if the value is out of normal operating range. As another example, where a microprocessor or DSP system is utilized, a voltage value can be generated to command the current, and the detector 20 can be configured as executable instructions programmed to evaluate the current command data and compare this value relative to a threshold to determine if an open loop condition exits. As yet another example, in an analog current control system, the detector 20 can be implemented as a comparator that compares the control voltage relative to a predetermined threshold to ascertain whether an open loop conditions exists.

Figure 2:
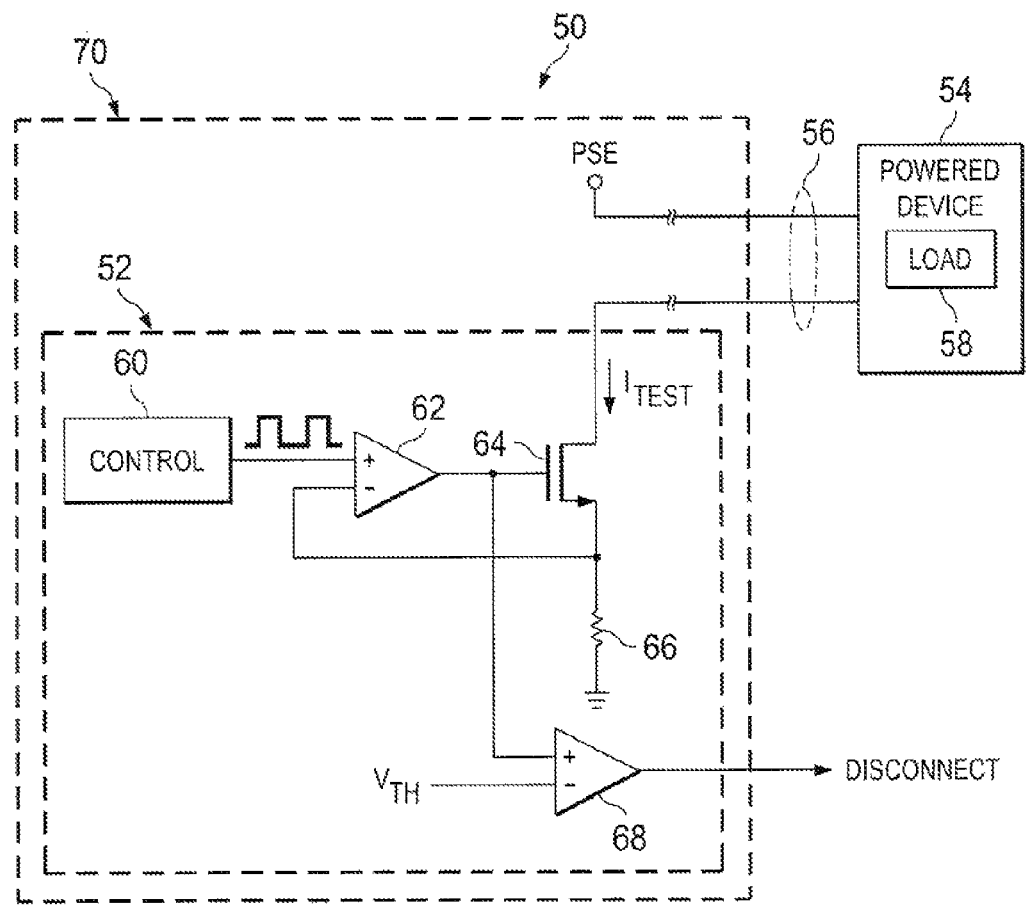
FIG. 2 depicts an example of another system that can be utilized to detect disconnection of a powered device from a power over Ethernet system according to an aspect of the invention.

FIG. 2 depicts an example of part of a PoE system 50 implementing a disconnect detection system 52 according to an aspect of the invention. In the example of FIG. 2, a powered device 54 is connected to a link 56 of the PoE system 50, indicated schematically at 56. The powered device 54 includes a power consuming load 58, such as circuitry that utilizes the power supplied via the link 56. The link 56 typically includes at least one pair of electrically conductive cables, although any number of conductors can be utilized for the PoE system 50. The cables in the link 56 can be electrically connected to PSE (shown schematically at 70) for providing power to device coupled to the link 56. The disconnect detection system 52 can be implemented as part of the PSE 70 or it can be implemented externally to the PSE.

In the example of FIG. 2, the detection system 52 is depicted as including an analog closed-loop control configured to control a test current $I_{TEST}$ that is delivered to the powered device 54 via the link 56. As disclosed herein, the detection system 52 can be implemented in a variety of different technologies, which can vary according to application requirements.

The detection system 52 includes a control block 60 that provides a control signal, such as a series of control pulses, such as can be delivered at a predetermined timing interval. The timing interval between pulses, for example, should be sufficient to enable detection of a disconnect within the PoE standards to which the system 50 is designed to operate (e.g., the above-incorporated 802.3af Standard). Each control pulse can be provided at a predetermined reference voltage and have a pulse width to result in a predetermined test current to be delivered to the powered device 54 during the pulse.

The control pulses can be provided to a gate driver 62 that is configured to supply a control voltage at a gate of a field effect transistor (FET). In the example of FIG. 2, the FET 64 is electrically connected between a conductor of the link 56 and electrical ground. In the example of FIG. 2, a sense resistor 66 is coupled between the source of the FET 64 and ground to provide a feedback voltage to an inverting input of the driver 62. Thus, by providing a control pulse to the non-inverting input of the driver 62 and in conjunction with the feedback at its inverting input, the FET 64 can be controlled to supply a predetermined test current $I_{TEST}$ to the powered device via the link 56 while the powered device remains connected to the link 56 to provide a closed loop path with the PSE.

In the example of FIG. 2, a comparator 68 is configured to detect an open loop condition corresponding to a disconnection of the powered device 54. The comparator 68 has a non-inverting input that is coupled to the gate of the FET 64 for monitoring the control voltage. A predetermined threshold voltage $V_{TH}$ is supplied to the inverting input of the comparator 68. The comparator 68 thus provides an output signal based on the comparison of the gate control voltage relative to the threshold voltage $V_{TH}$. This output is indicated as a disconnect signal, and is asserted if the control voltage exceeds the threshold. Thus, in the event that the powered device 54 is disconnected from the link 56 while the control block activates the test current $I_{TEST}$, the control voltage provided by the driver 62 goes high—outside of expected operating parameters. As a result, the gate control voltage exceeds the threshold voltage $V_{TH}$ such that the comparator 68 asserts its disconnect output. Conversely, under normal operating conditions when the powered device 54 remains connected with the link, the test current is supplied during the short pulse at a desired level, such that the control voltage provided to the gate of the FET 64 remains within expected operating parameters (e.g., below the threshold voltage $V_{TH}$). Those skilled in the art will understand and appreciate that the comparator or other detection circuitry could be connected to other portions of the detection system 52 to detect whether the open loop condition exists responsive to controlling the test current $I_{TEST}$ to link 56.

Figure 3:
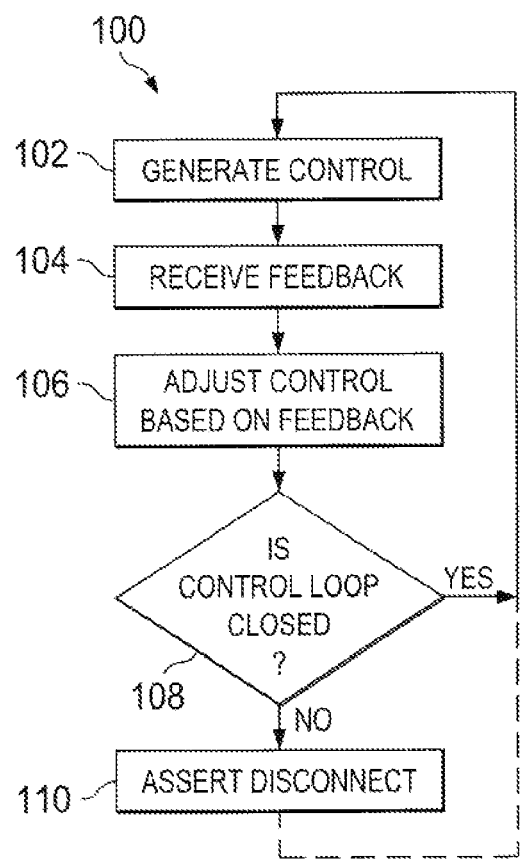
FIG. 3 is a flow diagram depicting a method for detecting disconnection of a powered device from a power over Ethernet system according to an aspect of the invention.

In view of the foregoing structural and functional features described above, certain methods will be better appreciated with reference to FIG. 3. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., analog or digital circuitry, such as may be embodied in an application specific integrated circuit), software (e.g., as executable instructions stored in memory or running on one or more a processor), or any combination of hardware and software.

FIG. 3 is a flow diagram depicting an example method 100 that can be utilized to detect disconnection of a powered device from a PoE system. The method 100 can be implemented by a PSE or be implemented by circuitry external to the PSE (e.g., a separate module). As mentioned herein, the method can be utilized to continuously monitor for a disconnected PD to comply with PoE standards, such as to verify the disconnect during a 300-400 ms time period. The method 100 begins at 102 in which control is generated for intermittently (e.g., periodically) supplying a current pulse to a link of a PoE system to which a powered device is connected. The control (at 102) is implemented as part of a closed-loop current control such as shown and described herein.

In response to the current control being supplied for providing a test current relative to the powered device, feedback is received at 104 indicative of the test current during the control period associated with 102. At 106, the control can be adjusted based on the feedback received at 104.

At 108, a determination is made as to whether the current control loop is closed. That is, one or more parameters associated with the closed-loop control can be monitored to ascertain whether closed-loop control can be maintained or if an open loop condition exists. An open loop condition in the control-loop is indicative of the powered device being disconnected from its associated link. If the determination at 108 is negative (NO), indicating that an open loop condition exits, the method proceeds to 110. At 110, a disconnect signal is asserted. The disconnect signal, for example, can be utilized to control power that is being delivered by the PSE, such as to safely remove power from the link within a predetermined period of time (e.g., within about 300 to about 400 ms) from the detected disconnect via a corresponding port (e.g., a link) or to take other action. It will be appreciated that the method 100 can continue to be performed while a disconnect is detected at 108. For instance, the method 100 can return from 110 to 102 to verify the disconnection in compliance with PoE standards, as depicted by a dashed line.

If the determination of 108 is affirmative (YES), indicating that the control loop remains closed, the method can return to 102 in which a next control can be implemented for generating the test current utilizing the closed-loop control. The testing process of 102 to 108 can be utilized to periodically check whether the powered device has been disconnected from the PoE.

Those skilled in the art will understand and appreciate the method 100 can be implemented in a variety of topologies which may include analog or digital techniques for implementing closed loop current control. Accordingly, the detection of whether the control loop is closed or open can be ascertained by monitoring various parameters associated with the current control loop. Those skilled in the art will understand and appreciate various ways to implement such detection based upon the manner in which the current control loop is being implemented.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A detection system to detect disconnection of a powered device from a link of a power over Ethernet system, the detection system comprising:
    closed-loop control configured to supply a predetermined test current to an electrically conductive path that includes at least a portion of the link via which the powered device is connectable for receiving power, wherein the closed-loop control further comprises:
    a transistor coupled to provide the test current to the link; and
    a driver coupled to drive the transistor with a drive voltage based on a control signal,
    wherein a comparator is configured to compare the drive voltage with a threshold voltage and
    configured to monitor the closed-loop control and to provide a disconnect signal if the closed-loop control is outside of expected operating parameters, thereby indicating that the powered device has been disconnected from the link.

2. The detection system of claim 1, wherein the closed-loop control comprises a current source that is connected to the link and configured to provide the predetermined test current as an intermittent current pulse in response to a control signal.

3. The detection system of claim 2, wherein the detector monitors the control signal and provides the disconnect signal if the control signal is outside of expected operating parameters.

4. The detection system of claim 3, wherein the closed-loop control further comprises a controller configured to provide the control signal in response to feedback indicative of the predetermined test current.

5. The detection system of claim 4, wherein the detector monitors the feedback and provides the disconnect signal if the disconnect signal is outside of expected operating parameters.

6. The detection system of claim 1, wherein the detector comprises a comparator that compares a control parameter from the closed-loop control relative to a threshold and provides the disconnect signal at an output thereof based on the comparison to indicate whether the control parameter is outside of an expected operating range.

7. The system of claim 1, wherein the closed-loop control provides the predetermined test current periodically at a predetermined test interval.

8. The system of claim 7, wherein the predetermined test interval is set to comply with a power over Ethernet standard.

9. A power over Ethernet system comprising the detection system of claim 1, the power over Ethernet system comprising power sourcing equipment configured to supply power to the powered device via the link, the detection system being implemented as part of the power sourcing equipment.

10. A power over Ethernet system comprising:
    power sourcing equipment configured to supply power to at least one port;
    a powered device coupled to a respective one of the at least one port via an electrically conductive link for receiving power;
    a disconnect detection system coupled to the electrically conductive link, the disconnect detection system comprising:
        closed-loop control configured to supply a test current to the electrically conductive link, wherein the closed-loop control further comprises:
        a transistor coupled to provide the test current to the link; and
        a driver coupled to drive the transistor with a drive voltage based on a control signal,
    wherein a comparator is configured to compare the drive voltage with a threshold voltage and
        configured to provide a disconnect signal in response to detecting an open loop condition in the closed-loop control indicative of the powered device being disconnected from the electrically conductive link.

11. The system of claim 10, wherein the closed-loop control comprises a current source that is connected to the electrically conductive link and configured to provide the test current as an intermittent current pulse in response to a control signal.

12. The system of claim 11, wherein the detector monitors the control signal and provides the disconnect signal to indicate if the control signal is outside of expected operating parameters.

13. The system of claim 10, wherein the closed-loop control further comprises a controller configured to provide the control signal in response to feedback representing the test current.

14. The system of claim 10, wherein the detector comprises a comparator that compares a control parameter from the closed-loop control relative to a threshold and provides the disconnect signal at an output thereof based on the comparison indicating that the control parameter is outside of an expected operating range.

15. The system of claim 10, wherein the closed-loop control provides the test current with a predetermined level periodically at a predetermined test interval to comply with a power over Ethernet standard.

16. A method for detecting that a powered device has disconnected from a link of a power over Ethernet system, the method comprising:
    generating a control signal as part of a closed-loop control for delivering a test current to the link to which the powered device is connected;
    driving a transistor with a drive voltage based on the control signal;
    comparing the drive voltage with a threshold voltage for detecting an open loop condition; and
    asserting a disconnect signal in response to detecting an open loop condition in the closed-loop control.

17. The method of claim 16, further comprising:
    receiving feedback indicative of the test current delivered to the link; and
    adjusting the control signal responsive to the feedback.

18. The method of claim 16, wherein the control signal is generated periodically at a predetermined interval.

19. The method of claim 18, wherein the predetermined interval is set to comply with a power over Ethernet standard for detecting disconnection of the powered device.

* * * * *